3,022,344
THIO-SUBSTITUTED HALOALKANEAMIDES
Samuel Allen Heininger and Gail H. Birum, Dayton, Ohio, assignors to Monsanto Chemical Company, St. Louis, Mo., a corporation of Delaware
No Drawing. Filed Feb. 21, 1957, Ser. No. 641,472
4 Claims. (Cl. 260—558)

This invention relates to amide products and more particularly provides thio-substituted haloalkaneamides.

In accordance with this invention, there are provided thio-substituted haloalkaneamides of the formula

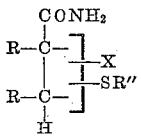

where each R is selected from hydrogen and hydrocarbon radicals containing from 1 to 6 carbon atoms and free of aliphatic unsaturation, provided that at least one R represents hydrogen; X represents a halogen atom and R″ represents an aromatic hydrocarbon or halogenated hydrocarbon radical.

In one embodiment of this invention, compounds having the above formula are provided by the reaction of a sulfenyl halide with an α,β-olefinic amide as illustrated by the following equation:

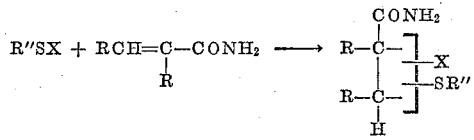

where R, R″, and X are as defined hereinabove. The respective points of attachment of the halogen atom represented by X and the substituted thio radical presented by SR″ in this addition reaction have not been established with certainty, and therefore the schematic general formula as shown above is utilized in illustrating the present products.

From theoretical considerations, we expect that the sulfenyl halide on addition to the double bond of an α,β-olefinic amide should produce addition of a halogen atom onto the beta carbon atom. As a means of obtaining an amide conforming to the formula of the products of the invention, wherein the halogen atom is known to be attached to the alpha carbon atom, it forms a further embodiment of this invention to prepare thio-substituted haloalkaneamides by the reaction of a thiol with an α-haloacrylamide as illustrated by the following equation:

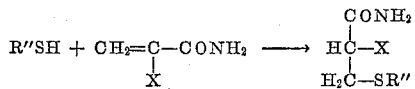

where R″ and X are as defined hereinabove.

The new thio-substituted haloalkaneamides of this invention are useful as parasiticides and are adapted to be employed as the active toxic constituents of compositions for the control of bacteria and fungi such as *Micrococcus pyogenes* var. *aureus* and *Aspergillus niger*.

In accordance with the embodiments of this invention illustrated by the first equation above, the present substituted amides are prepared by the reaction of a sulfenyl halide with an α,β-olefinic amide. The α,β-olefinic amides useful in this process are of the formula

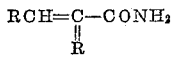

where each R is selected from hydrogen and hydrocarbon radicals containing from 1 to 6 carbon atoms and free of aliphatic unsaturation, provided that at least one R represents hydrogen. Acrylamide and methacrylamide are preferred members of this series, for reasons of ready availability, low cost and high reactivity. Other α-hydrocarbyl-substituted amides conforming to the above formula and containing an α-methylene group are also highly reactive; exemplary of such amides are 2-ethylacrylamide, 2-butylacrylamide, 2-neopentylacrylamide, 2-hexylacrylamide, 2-phenylacrylamide, 2-cyclohexylacrylamide, etc. The α,β-olefinic amides wherein a hydrocarbon substituent is attached to the beta carbon atom of acrylamide form another class of presently useful amides; exemplary of such compounds are cinnamamide, 3-cyclohexylacrylamide, 3-ethylacrylamide, etc.

The sulfenyl halides reacted with α,β-olefinic amides in accordance with this invention are of the formula R″SX where R″ represents an aromatic hydrocarbon or halogenated aromatic hydrocarbon radical attached to the sulfenyl halide radical by a nuclear carbon atom, and X represents halogen. The radicals to which the sulfenyl halide groups are attached are preferably free of aliphatic unsaturation and may contain up to 12 carbon atoms. By an aromatic radical is herein denoted a radical containing a benzene nucleus. By aliphatic unsaturation is meant carbon-to-carbon, olefinic or acetylenic unsaturation. While chlorine is a preferred halogen substituent in the sulfenyl halides used in the process of the invention, it is also possible to employ bromo or iodo substituents either on the hydrocarbon radical or in the sulfenyl halide portion of the molecule as substitutes for chlorine; the halogen fluorine is generally less reactive and is not preferred in the present process as the halogen member of the sulfenyl halide group, but may be present as a substituent on the hydrocarbon radical.

One class of sulfenyl halides which may be employed in the reaction of this invention comprises aromatic sulfenyl halides wherein the sulfenyl halide radical is attached to a nuclear carbon atom of an aromatic hydrocarbon radical, e.g., benzenesulfenyl halide, o-toluenesulfenyl chloride, p-toluenesulfenyl chloride, mixed isomeric toluenesulfenyl chlorides, p-toluenesulfenyl bromide, 2,4-dimethylbenzenesulfenyl chloride, mixed xylenesulfenyl chloride isomers, 4-isopropylbenzenesulfenyl chloride, 2,4-diethylbenzenesulfenyl chloride, 2-methyl-4-t-butylbenzenesulfenyl chloride, naphthalenesulfenyl chloride, 4-biphenylsulfenyl chloride, etc.

Halogenated sulfenyl halides are also reactive with amides in accordance with the process of this invention, wherein there is employed an amide in which an olefinic hydrocarbon radical is attached to the amide function.

In a particularly preferred embodiment of this invention, there is reacted with one of the presently useful amides a halogenated aromatic sulfenyl halide wherein the sulfenyl halide radical is attached to a nuclear carbon atom of a halogen-substituted benzene ring. Exemplary of such aromatic sulfenyl halides are halobenzenesulfenyl halides such as 2-, 3-, and 4-chlorobenzenesulfenyl chloride, 2,4-, 2,5-, and 3,5-dichlorobenzenesulfenyl chloride, 2,4,5-trichlorobenzenesulfenyl chloride, 4-bromobenzenesulfenyl chloride, 4-iodobenzenesulfenyl chloride, 4-fluorobenzenesulfenyl chloride, 3-bromo-4-chlorobenzenesulfenyl chloride, 4-chlorobenzenesulfenyl bromide, pentachlorobenzenesulfenyl chloride, etc. Other presently useful monocyclic halogenated aromatic sulfenyl halides include, e.g., halogenated alkyl-substituted aromatic sulfenyl halides such as 3-chloro-4-methylbenzenesulfenyl chloride, 2,4-dichloro-3-methylbenzenesulfenyl chloride, 3-chloro-4-isopropylbenzenesulfenyl chloride, 3-chloro-4-neopentyl-benzenesulfenyl chloride, chloromethylbenzenesulfenyl chloride, trichloromethylbenzenesulfenyl chloride, 4-α-chloroethylbenzenesulfenyl chloride, etc. In the present invention, it is further contemplated that there should be employed polycyclic sulfenyl halides such as 5-chloronaphthalenesulfenyl chloride, 5,8-dichloronaphthalenesulfenyl chloride, 4'-chloro-4-biphenylsulfenyl chloride etc.

By the reaction of a sulfenyl halide with an α,β-olefinic amide in accordance with this invention there is formed a thio-substituted haloalkaneamide. In the present instance, in contrast to the reaction of the corresponding sulfenyl halides with, for example, acrylonitrile, the reaction of an olefinic amide such as acrylamide with a sulfenyl halide appears to proceed to form a single adduct in high yield. Because of the uncertainty of the position of attachment of the halogen and thio groups, we prefer to name the present products as 3(2)-halo-2(3)-(substituted thio)-alkaneamides, where by, for example, 3(2)-chloro-2(3)-(phenylthio)-propionamide is meant to be understood that the designated compound may be either 3-chloro-2-(phenylthio)propionamide or 2-chloro-3-(phenylthio)propionamide. From our attempted structure proofs and from certain reactions reported in the literature, the former isomeric form appears more likely, though an unequivocal assertion of the identity of the presently provided compounds derived from a sulfenyl halide reaction is not at present justifiable.

When an aromatic sulfenyl halide wherein the sulfenyl halide radical is attached to a nuclear carbon atom of a monocyclic hydrocarbon radical is reacted in accordance with this invention with an olefinic amide, there are obtained products derived from acrylamide such as 3(2)-chloro-2(3)-(phenylthio)propionamide,
3(2)-chloro-2(3)-(4-methylphenylthio)propionamide,
3(2)-chloro-2(3)-(2-methylphenylthio)propionamide,
3(2)-chloro-2(3)-(2,4-dimethylphenylthio)propionamide,
3(2) - chloro-2(3)-(3-ethyl-4-methylphenylthio)propionamide,
3(2)-chloro-2(3)-(3-methyl - 4 - isoamylphenylthio)propionamide,
3(2)-bromo-2(3)-(4-t-butylphenylthio)-propionamide,
3(2)-chloro-2(3)-(trimethylphenylthio)propionamide,
3(2)-bromo-2(3)-(phenylthio)propionamide, etc.; and products derived from α- and β-hydrocarbyl acrylamides such as 3(2)-chloro-2(3)-(4-methylphenylthio) - 2 - methylpropionamide,
3(2)-bromo-2(3)-(phenylthio)-2-butylpropionamide,
3(2)-chloro-2(3)-(tolylthio)-3-cyclohexylpropionamide,
3(2)-chloro-2(3)-(phenylthio)-butyramide,
3(2)-chloro-2(3)-(xylylthio)-3-phenylpropionamide.

Exemplary of presently provided adducts derived from sulfenyl halides of polycyclic hydrocarbons are, e.g., 3(2)-chloro-2(3)-(4-cyclohexylphenylthio)propionamide, 3(2)-chloro-2(3)-(naphthylthio) - 2 - methylpropionamide, 3(2)-chloro-2(3)-(biphenylthio)-butyramide, etc.

A particularly preferred embodiment of the present invention comprises products derived from halogenated aromatic sulfenyl halides. Illustrative of the presently provided amides derivable from monocyclic halogenated aromatic sulfenyl halides are, e.g., 3(2)-chloro-2(3)-(4-chlorophenylthio)propionamide,
3(2)-chloro-2(3)-(3,4-dichlorophenylthio)propionamide,
3(2)-chloro-2(3)-(2,4-dichlorophenylthio)propionamide,
3(2)-chloro-2(3)-(pentachlorophenylthio)propionamide,
3(2) - chloro-2(3)-(3-bromo-4-iodophenylthio)propionamide,
3(2)-chloro-2(3)-(3-chloro - 4 - methylphenylthio)propionamide,
3(2) - chloro-2(3)-(3-chloro-4-neopentylphenylthio)propionamide,
3(2)-chloro - 2(3) - (chloromethylphenylthio)propionamide,
3(2) - chloro-2(3)-(trichloromethylphenylthio)propionamide,
3(2) - chloro-2(3)-(2-chloro-4-chloromethylphenylthio)propionamide,
3(2)-chloro-2(3)-(4-chlorophenylthio) - 2 - methylpropionamide,
3(2)-chloro-2(3)-(4-fluorophenylthio) - 2 - methylpropionamide,
3(2) - chloro-2(3)-(2,4,5-trichlorophenylthio)-2-methylpropionamide,
3(2)-chloro - 2(3) - (3 - chloro-4-methylphenylthio)-2-ethylpropionamide,
3(2) - chloro-2(3)-(4-chlorophenylthio)-2-hexylpropionamide,
3(2)-chloro-2(3)-(pentachlorophenylthio) - 3 - phenylpropionamide, etc. By reaction of polycyclic sulfenyl halides with olefinic amides there are obtained adducts such as 3(2)-chloro-2(3)-(chloronaphthylthio)propionamide,
3(2)-chloro-2(3)-(hexachlorobiphenylthio) - 2 - methylpropionamide,
3(2) - chloro-2(3)-(trichloronaphthylthio)-1-cyclohexylpropionamide, etc.

The reaction of a sulfenyl halide with an olefinic amide to produce the products of this invention as shown by the equation for the reaction given above requires equimolecular amounts of sulfenyl halide and olefinic amide. If desired, an excess of the more readily available component may be present in the reaction mixture to serve, e.g., as a reaction diluent; when such excess of one reaction component is employed, the unreacted material can generally be recovered unchanged at the close of the reaction. The rapidity of the reaction varies greatly, depending on the reactants chosen. Exothermic reactions may require cooling and/or diluents to moderate their violence, while other reactions do not reach completion until after a period of refluxing at elevated temperatures. Suitable inert solvents and diluents which may be employed in the reaction mixture if desired include hydrocarbons such as benzene, halogenated solvents such as carbon tetrachloride, oxygenated solvents free of active hydrogen, such as ether, etc. A particularly preferred class of solvents are anhydrous organic carboxylic acids and especially glacial acetic acid, since this solvent also has the advantage of acting as a catalyst for the reaction. A mixture of carboxylic acid and solvents may also be used as a reaction medium if desired.

The use of catalysts is not necessary, but is advantageous in promoting rapid reaction. Exemplary of catalysts which may be used in the present reaction, besides glacial acetic acid as mentioned above, are, e.g., acid catalysts such as a Friedel-Crafts boron trifluoride complex catalyst. Pressure variation may also be utilized to facilitate the conduct of the reaction, e.g., by carrying out the reaction in a pressure resistant vessel under autogenous pressure and at elevated temperatures.

Since the present unsaturated compounds and particularly acrylamide and the α-substituted acrylamides, are susceptible to thermal polymerization, the reaction is preferably conducted in the presence of polymerization inhibitors. Examples of suitable polymerization inhibitors are, e.g., hydroquinone, the monomethyl ether of hydroquinone, methylene blue, copper carbonate, selenium dioxide, etc.

The time required to accomplish the reaction and form the presently afforded product depends on functional factors such as the reactivity of the α,β-olefinic amide and the sulfenyl halide, the temperature of reaction, the presence or absence of catalysts, etc. Reaction rates and times of reaction may vary considerably, also, depending on details of apparatus or operational conditions. By modifications in the apparatus, continuous procedures may be substituted for the batch-type operations described below.

An indication of the progress of the reaction is a color change in the reaction mixture; generally, sulfenylhalides are a deep red color, and the reaction mixture lightens as the sulfenyl halide is consumed. On completion of the reaction, conventional methods such as filtration, decantation, distillation and evaporation may be employed to separate the product. It is to be noted that elevated temperatures employed during distillation may promote dehydrochlorination of the present product, especially in the presence of hydrogen chloride acceptors.

The details of modes of procedure in accordance with this invention are illustrated by the following non-limiting examples:

Example 1

To a mixture of 14.2 g. (0.2 mole) of acylamide and 100 ml. of glacial acetic acid was added 35.8 g. (0.2 mole) of p-chlorobenzenesulfenyl chloride. There was an immediate exothermic reaction, the reaction mixture heating spontaneously to 55° C. and becoming a light yellow in color within 2 to 3 minutes. After standing for about ½ hour, the reaction mixture was filtered and poured into ice water, precipitating an oil which crystallized on stirring into a hard, white solid. The solid product was filtered off, washed with water and dried; there were thus obtained 46 g. (92% yield) of 3(2)-chloro-2(3)-(4-chlorophenylthio)propionamide, m. 92–94° C. The crude product was recrystallized from ethanol-water, whereby there was separated a small amount of bis(chlorophenyl)disulfide, m. 70–72° C. A twice crystallized sample of the amide product melted at 99–100° C.; the identity of the product was confirmed by elementary analysis to be $C_9H_9Cl_2NOS$.

Similarly, 0.3 mole of methacrylamide is reacted with 0.3 mole of p-toluenesulfenyl chloride in the presence of glacial acetic acid to produce 3(2)-chloro-2(3)-(p-tolylthio)-2-methylpropionamide.

For the preparation of beta-hydrocarbyl-substituted acrylamide derivatives in accordance with this invention, 0.3 mole of a β-substituted amide is mixed with glacial acetic acid and 0.3 mole of an aromatic sulfenyl halide and the reaction mixture is heated at 70–90° C. to produce a thio-substituted amide, e.g., by the reaction of cinnamamide with o-toluenesulfenyl chloride there is obtained 3(2)-chloro-2(3)-(o-tolylthio)-3-phenylpropionamide.

Example 2

This example illustrates the evaluation of one of the present amides as a bactericide and fungicide.

The 3(2)-chloro - 2(3)-(4-chlorophenylthio)propionamide obtained by a reaction of p-chlorobenzenesulfenyl chloride with acrylamide as described above, was incorporated into hot sterile agar which was subsequently poured into Petri dishes, cooled and allowed to harden. Nutrient agar containing the test compound was then inoculated with the bacteria *Micrococcus pyogenes* var. *aureus* and *Salmonella typhosa* and Sabouraud's dextrose agar containing the test compound was inoculated with the fungus organism *Aspergillus niger*. The plates were incubated for 2 days at 37° C. It was found that the presence of this amide gave 100% control of the growth of each of the above microorganisms at a concentration of 0.1%, and was effective for the control of *M. pyogenes* at concentrations down to 100 parts per million.

To provide a synthesis for α-haloalkaneamides of the present general formula in the contingency that the present reaction of sulfenyl halides with olefinic amides results in the formation of β-halo compounds, it forms a further embodiment of the present invention to provide thio-substituted haloalkaneamides by the reaction illustrated by the equation

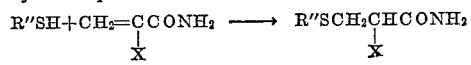

where R″ represents an aromatic hydrocarbon, or halogenated hydrocarbon radical, and X represents a halogen atom. The α-haloalkaneamide employed in this reaction may be α-chlor-, α-bromo-, α-iodo-, or α-fluoroacrylamide, α-chloracrylamide being preferred. The thiol of the formula R″SH employed in this reaction is preferably one wherein the radical attached to the thiol function is an aromatic hydrocarbon or halogenated hydrocarbon radical free of aliphatic unsaturation and containing up to 12 carbon atoms, attached to the thiol function by a nuclear carbon atom. The halogen present in such halogenated thiols may be chlorine, bromine, iodine or fluorine; chlorine is preferred. One class of the presently useful thiols are the hydrocarbon-thiols such as thiophenol; alkylthiophenols such as p-methylthiophenol, 2,4-dimethylthiophenol, 4-isopropylthiophenol, 3-propylthiophenol, 4-t-butylthiophenol, etc., and polycyclic aromatic thiols such as naphthalenethiol, 4-biphenylthiol, 3′,4′-dimethyl - 4 - biphenylthiol, 4 - cyclohexylthiophenol, etc. Halogenated thiols which may be added to olefinic α-haloacrylamides in accordance with this invention include halogenated thiophenols such as 2-, 3-, and 4-chlorothiophenol, 2,4-, 3,4-, and 2,5-dichlorothiophenol, 2,4,5-trichlorothiophenol, pentachlorothiophenol, 4-bromothiophenol, 4-iodothiophenol, 4-fluorothiophenol, 3-chloro-4-bromothiophenol, etc.; halogenated alkylthiophenols such as 4-chloro-2-methylthiophenol, 3-chloro-4-neopentylthiophenol, 2,4-dichloro - 5 - methylthiophenol, 4-chloromethylthiophenol, etc.; and halogenated polycyclic thiols such as 5-chloronaphthalene-1-thiol, trichloronaphthalenethiol, hexachlorobiphenylthiol, etc.

In accordance with the present process employing the reaction of α-haloalkeneamides with thiols, there are provided 2-halo-3-thio-propionamides.

Illustrative of products obtained in accordance with this process are, e.g., 2-chloro-3-(phenylthio)propionamide,
2-chloro3-(p-tolylthio)propionamide,
2-bromo-3-(naphthylthio)propionamide,
2-chloro-3-(xylylthio)propionamide,
2-iodo-3-(tetramethylphenylthio)propionamide,
2-chloro-3-(4-chlorophenylthio)propionamide,
2-chloro-3-(trichloromethylphenylthio)propionamide,
2-chloro-3-(trichlorobiphenylthio)propionamide,
2-chloro-3-(dichloronaphthylthio)propionamide, etc.

In carrying out the present process for the preparation of thio-substituted haloalkaneamides from α-haloalkeneamides, one of the presently useful thiols is simply contacted with α-chloracrylamide or with α-bromo-, α-iodo-, or α-fluoroacrylamide until formation of the 2-halo-3-thiopropionamide has occurred. The reaction to give the present products requires approximately equimolecular amounts of the reactants. If desired, an excess of one component may be utilized as the reaction medium. The reaction may be carried out either in the absence or presence of solvents; examples of useful solvents or diluents are inert hydrocarbons such as benzene or hexane, chlorinated solvents such as carbon tetrachloride or ethylene dichloride. Polymerization inhibitors such as hydroquinone, the monomethyl ether of hydroquinone, copper carbonate, methylene blue, etc., may be incorporated in the reaction mixture, if desired, to inhibit heat-catalyzed polymerization of the α-haloacrylic reaction component. The present reaction is advantageously carried out in the presence of basic catalysts, e.g., sodium, sodium methylate, sodium ethylate, sodium hydroxide, pyridine, quaternary ammonium hydroxides, such as benzyltrimethyl-ammonium hydroxide, etc. The reaction temperature varies with the reactivity of the reactants; generally, the reaction mixture is conveniently heated to reflux to assure completion of the reaction, but this is not necessary. Advantageously, atmospheric pressure is employed, but pressure varation generally does not affect the reaction.

The present process for the production of α-haloalkaneamides substituted in the beta position by a substituted thio radical is exemplified by the following non-limiting example:

*Example 3*

To 12.4 g. (0.1 mole) of 4-methylphenylthiol in 50 ml. of dioxane containing 3 ml. of benzyltrimethylammonium hydroxide are added 10.6 g. (0.1 mole) of α-chloroacrylamide. The solution is refluxed for 2½ hours at 70–90° C. After neutralization with mineral acid, the dioxane solution is decanted, washed, and distilled. There is thus obtained 2-chloro-3-(4-methylphenylthio)-propionamide.

Similarly, by the addition of chlorobenzenethiol to α-bromacrylamide, there is obtained 2-bromo-3-(chlorophenylthio)-propionamide; by addition of tribromothiophenol to α-chloracrylamide there is obtained 2-chloro-3-(tribromophenylthio)propionamide, etc.

The presently afforded thio-substituted haloalkaneamides of the general formula

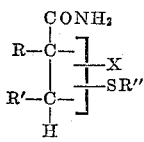

are stable compounds ranging from liquids to solid crystalline materials. They are useful for a wide variety of agricultural and industrial purposes. Thus, e.g., as disclosed above, they are adapted for the control of the growth of bacteria and fungi. The present amides may also be used to eliminate or control the growth of other parasitic biological organisms such as insects, nematodes, weeds, and other vegetation, etc. For such purposes, the present amides may be applied directly to the parasite or to the environment thereof, or may be employed as a constituent of solutions and aqueous dispersions or emulsions or in mixture with inert finely divided powders. The amides of the invention may also be employed as chemical intermediates, e.g., they may be dehydrohalogenated to produce vinyl monomers for the preparation of polymeric materials of utility in the manufacture of films, molded materials, etc., or the reactive halogen atom of the present amides may be reacted with, for example, a trialkyl phosphite to produce products having biological activity.

It is also contemplated that the presently provided sulfur-containing reaction products which are 3(2)-halo-2(3)-(substituted thio)alkaneamides produced by addition of an aromatic or halogenated aromatic sulfenyl halide to an α,β-olefinic amide or thiol to an α-halo-α,β-olefinic amide may be converted by oxidation (e.g., with hydrogen peroxide in acetic acid, potassium permanganate, chromic acid, etc.) into the corresponding sulfoxides and sulfones.

While the invention has been illustrated with reference to particular preferred embodiments thereof, it will be appreciated that variations can be made without departing from the spirit and scope of the invention.

What is claimed is:

1. Thio-substituted haloalkaneamides of the formula

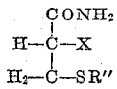

wherein X is a halogen atom and R″ is selected from the class consisting of the phenyl radical, the halophenyl radical having from 1 to 5 halogen atoms and the alkylphenyl radical having up to 12 carbon atoms.

2. Thio-substituted haloalkaneamides of the formula

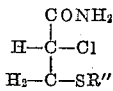

wherein R″ represents the halophenyl radical having from 1 to 5 halogen atoms attached thereto.

3. Thio-substituted haloalkaneamides of the formula

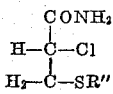

wherein R″ represents the phenyl radical having from 0 to 2 methyl radicals attached thereto.

4. 2-chloro-3-(p-tolylthio)propionamide.

References Cited in the file of this patent

Posner: Ber. Deut. Chem., p. 799, vol. 35 (1902).
Posner: Ber. Deut. Chem., p. 502, vol. 37 (1904).
Posner et al.: Ber. Deut. Chem., p. 646, vol. 38 (1905).
Posner: Ber. Deut. Chem., p. 4788, vol. 40 (1907).
Lecher et al.: Ber. Deut. Chem., p. 414, vol. 58 (1925).
Finzi et al.: Chem. Abs., p. 1526, vol. 25 (1931).
Ipatieff et al.: J.A.C.S., p. 2731, vol. 60 (1938).
Jones et al.: J.A.C.S., p. 2453, vol. 60 (1938).

UNITED STATES PATENT OFFICE
CERTIFICATE OF CORRECTION

Patent No. 3,022,344            February 20, 1962

Samuel Allen Heininger et al.

It is hereby certified that error appears in the above numbered patent requiring correction and that the said Letters Patent should read as corrected below.

Column 1, lines 68 to 69, the formula should appear as shown below instead of as in the patent:

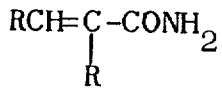

column 4, lines 21 and 22, for "1-cyclohexylpropionamide" read -- 2-cyclohexylpropionamide --; column 5, line 14, for "acylamide" read -- acrylamide --.

Signed and sealed this 28th day of August 1962.

(SEAL)
Attest:

ESTON G. JOHNSON
Attesting Officer

DAVID L. LADD
Commissioner of Patents